US012716874B2

(12) United States Patent
Cantrell

(10) Patent No.: US 12,716,874 B2
(45) Date of Patent: Aug. 25, 2026

(54) ANALOG FRONT-END CIRCUITRY FOR ULTRASOUND SIGNAL PROCESSING

(71) Applicant: Dwellwell Analytics, Inc., Bethesda, MD (US)

(72) Inventor: Cynthia E Cantrell, Hagerstown, MD (US)

(73) Assignee: Dwellwell Analytics, Inc., Bethesda, MD (US)

( * ) Notice: Subject to any disclaimer, the term of this patent is extended or adjusted under 35 U.S.C. 154(b) by 758 days.

(21) Appl. No.: 18/103,071

(22) Filed: Jan. 30, 2023

(65) Prior Publication Data

US 2023/0243783 A1 Aug. 3, 2023

Related U.S. Application Data

(60) Provisional application No. 63/305,165, filed on Jan. 31, 2022.

(51) Int. Cl.
*G01N 29/40* (2006.01)
*A01M 31/00* (2006.01)

(52) U.S. Cl.
CPC ........... *G01N 29/40* (2013.01); *A01M 31/002* (2013.01)

(58) Field of Classification Search
CPC ..................................................... G01N 29/40
USPC ........................................................... 73/602
See application file for complete search history.

(56) References Cited

U.S. PATENT DOCUMENTS

| | | | |
|---|---|---|---|
| 3,562,659 A | 2/1971 | Kulas | |
| 5,523,715 A | 6/1996 | Schrader | |
| 5,751,823 A | 5/1998 | Strickland | |
| 6,504,937 B1 * | 1/2003 | Papadopoulos | H03F 3/183 330/10 |
| 6,710,705 B1 * | 3/2004 | Smith | A01M 31/002 340/384.73 |
| 10,508,784 B2 * | 12/2019 | Chien | F21V 15/01 |

(Continued)

FOREIGN PATENT DOCUMENTS

| | | | |
|---|---|---|---|
| CA | 2098319 | 5/1993 | |
| CN | 112422105 A * | 2/2021 | H03H 17/02 |
| WO | 2021109492 A1 | 6/2021 | |

OTHER PUBLICATIONS

Zhang et al. Machine translation of CN112422105A. Published Feb. 2021. Accessed Sep. 2025. (Year: 2021).*

(Continued)

*Primary Examiner* — Walter L Lindsay, Jr.
*Assistant Examiner* — Philip T Fadul
(74) *Attorney, Agent, or Firm* — Klintworth & Rozenblat LLP

(57) ABSTRACT

In example embodiments, an apparatus includes a microphone, an emitter follower stage having an input coupled to the microphone, and an amplifier stage coupled to an output of the emitter follower stage. The amplifier stage is powered by a positive voltage regulator and a negative voltage regulator. In some embodiments, the microphone and the emitter follower stage are both referenced to a ground connection and are both biased by the positive voltage regulator. The output of the emitter follower stage may have an impedance that is an order of magnitude less than an impedance of the microphone. In some embodiments, the apparatus may be used to detect ultrasonic signals, such as those emitted by animals such as bats, rodents, and pest insects.

20 Claims, 4 Drawing Sheets

(56) References Cited

U.S. PATENT DOCUMENTS

| | | | | |
|---|---|---|---|---|
| 2004/0028236 | A1 | 2/2004 | Chelen | |
| 2008/0018441 | A1* | 1/2008 | Orrell | B60C 23/06 340/442 |
| 2020/0276440 | A1* | 9/2020 | Stevenson | H01G 4/005 |

OTHER PUBLICATIONS

Texas Instruments. "Hi-Fi Headphone Amplifier Power Supply Reference Design." Texas Instruments, TIDUCR0. Published Jan. 2017. https://www.ti.com/lit/pdf/tiducr0 (Year: 2017).*

"Transistor Emitter Follower Circuit: Common Collector Amplifier" electronics-notes.com, retrieved Jan. 29, 2022, from https://www.electronics-notes.com/articles/analogue_circuits/transistor/transistor-common-collector-emitter-follower.php (4 pages).

Coffey, K. et al., "DeepSqueak: a deep learning-based system for detection and analysis of ultrasonic vocalizations." Neuropsychopharmacology 44, No. 5, 2019 pp. 859-868 (10 pages).

Goussha, Y. et al., "HybridMouse: a hybrid convolutional-recurrent neural network-based model for identification of mouse ultrasonic vocalizations." Frontiers in Behavioral Neuroscience 15, 2022 (12 pages).

* cited by examiner 100
104
106
108
110

ANALOG FRONT-END CIRCUITRY FOR ULTRASOUND SIGNAL PROCESSING

CROSS-REFERENCE TO RELATED APPLICATION

The present application claims benefit under 35 U.S.C. § 119(e) from U.S. Provisional Patent Application No. 63/305,165, entitled "Analog Front-End Circuitry for Ultrasound Signal Processing", filed Jan. 31, 2022, the entirety of which is incorporated herein by reference.

BACKGROUND

The present disclosure relates to circuitry for ultrasound signal detection and processing. Detection of ultrasound signals often involves the use of microphones with very high impedance. Using conventional techniques, the processing of signals from high impedance microphones can introduce an unacceptable amount of noise in the circuitry, particularly where the ultrasound signals being detected have very low levels, as in the case, for example, where ultrasound signal processing is used to detect the activity of animals such as rodents or pest insects.

SUMMARY

In example embodiments an apparatus includes a microphone, an emitter follower stage having an input coupled to the microphone; and an amplifier stage coupled to an output of the emitter follower stage. In some embodiments, the impedance of the microphone is between 1 kohms and 5 kohms (e.g. between 2 kohms and 3 kohms), and the output of the emitter follower stage has an impedance of under 200 ohms (e.g. between 100 and 200 ohms). Thus, the output of the emitter follower stage may have an impedance less than $1/10^{th}$ or even less than $1/20^{th}$ of the impedance of the microphone. The amplifier stage may have an output impedance of under 200 ohms (e.g. between 100 and 200 ohms). Thus, the output of the emitter follower stage may have an impedance less than $1/10^{th}$ or even less than $1/20^{th}$ of an impedance of the microphone. A reduction in the input impedance of the following amplifier stage may allow for resistors with low resistance (e.g. under 200 ohms, or even under 100 ohms) to be used in that amplifier stage, thereby reducing thermal (Johnson) noise introduced in the signal.

In some embodiments, the apparatus may be used to detect ultrasonic signals, such as those emitted by animals such as bats, rodents, and pest insects. In some embodiments, the apparatus operates to filter out audio-band signals. This filtering may be performed at the amplifier stage.

BRIEF DESCRIPTION OF THE DRAWINGS

FIG. 1A is a top view. FIG. 1B is a front view. FIG. 1C is a bottom view. FIG. 1D is a right side view. FIGS. 1E and 1F are front perspective views.

DETAILED DESCRIPTION

As illustrated in FIGS. 1A-1F, a device 100 includes a housing 108 having a rear surface 104. A set of power plug prongs 106 extends from the rear surface of the housing. Although the illustrated prongs are those compatible with standard North American outlets, other configurations may alternatively be used.

A sensor node as illustrated in FIGS. 1A-1F may include ultrasonic detection circuitry. Such circuitry may be used to detect activity of animals such as bats and rodents, although the embodiments described herein are not limited to such uses.

Some amplifier systems include a first amplifier stage to avoid degrading the signal to noise ratio available to the next processing stages. This first stage is generally designed to match the source's output impedance to maximize power transfer, and filtering may or may not be done at this stage. If filtering is performed, it is generally designed to accommodate the source impedance as well.

Many ultrasonic microphones are wide-band and include the entire audio band in their output. Often the ultrasound signal is small and needs to be amplified in order to be in an optimal range for measurement and detection, such as by an analog-to-digital converter (ADC). However, any audio signals present at the same time may be quite loud and could easily saturate the detection system if amplified.

For high-impedance sources, like the 1 k to 5 kohms of electronic microphones, matching that impedance, for use by an amplifier to boost the signal, and the subsequent high resistance of filtering components leads to high noise in amplifier and filtering stages due to the high thermal (Johnson) noise of the high-value resistances used in those designs.

When op-amps are used in an amplifier system with a single-ended microphone source, it is common to bias one input of the amplifier(s) at half of the supply voltage with a resistor divider. These resistors add another noise source into the amplifier/detection chain. Some applications have one side of the microphone connected to ground, and as this is not the same as the ½ supply voltage bias of the amplifier(s) common-mode noise from the microphone is not rejected. These high-impedance resistors provide a direct injection path for their thermal (Johnson) noise, as well as ground noise, into each stage of the amplifier chain.

If loud signals in the audio band are amplified along with lower-level ultrasound signals, saturation of the audio band signals will create harmonics in the ultrasonic region and interfere with the detection of those ultrasonic signals.

Figures 1A, 1B, 1C, 1D, 1E, 1F:
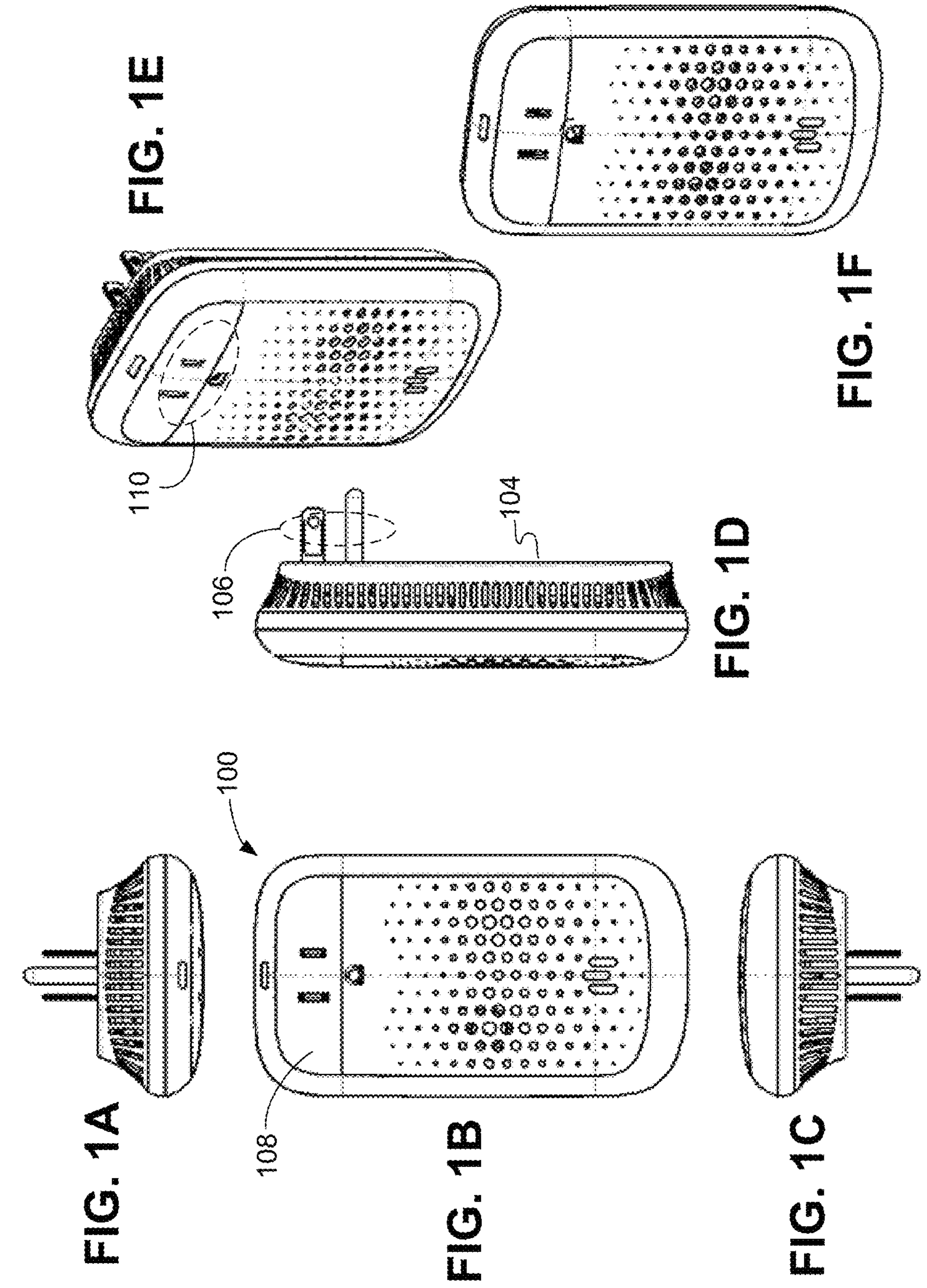
FIGS. 1A-1F are illustrations of a sensor node device that may be used in some embodiments.
Figure 2:
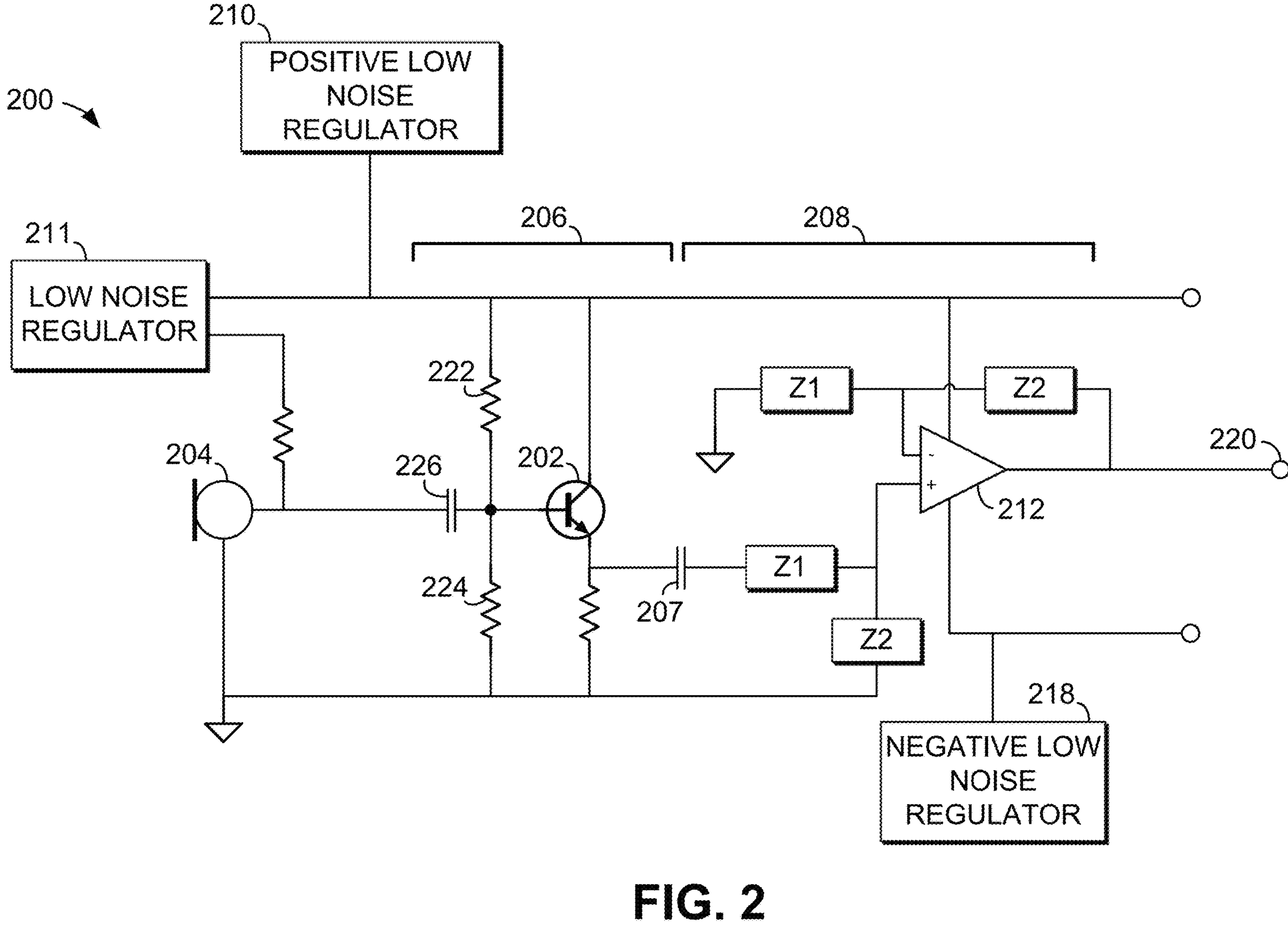
FIG. 2 is a schematic diagram of an analog front-end circuit according to some embodiments.

To address one or more of these issues, example embodiments employ an emitter follower between the microphone and the amplifier stage. An example of a circuit 200 according to some embodiments is illustrated in FIG. 2. An emitter follower stage 206 including transistor 202 provides impedance matching with the microphone 204 and substantially lowers the impedance seen by the amplifier stage 208. The values of resistors 224, 226 and capacitors 226 may be selected to match output impedance of the microphone 204. The amplifier stage 208 may be capacitively coupled to the emitter follower stage 206 through a capacitor 207. In example embodiments, the amplifier stage uses much lower resistor values, on the order of 100 ohms or lower, rather than the roughly 2.5 Kohms of the microphone. The emitter follower 206 may lead to a small voltage reduction and a small noise addition due to the transistor. However, this is offset by a reduction of thermal noise in the subsequent amplifier stage 208 and any additional amplifier stages. For example, a roughly 25× reduction in resistance values for subsequent amplifier stages leads to thermal noise reduction proportional to the square root of the resistance reduction (5×, in this example), which can make up for the small noise added at the emitter stage.

In some embodiments, the emitter follower 206 is powered by a positive low-noise voltage regulator 210 that is the same as the low-noise regulator that supplies the amplifier 212 and/or any amplifier in a subsequent amplifier stage. In some embodiments, the same low-noise regulator 210 provides source power for the microphone 204 as well. This minimizes combining noise from several power supplies into the signal path. In some embodiments, the microphone may be powered by a different low noise regulator 211, for example to provide a higher voltage than the voltage supplied by regulator 210, or for other reasons, such as further noise reduction.

As standard single-ended microphones are connected to ground, some embodiments of the present disclosure also ground the reference side of amplifier(s), such as amplifier 212 in the gain stage(s) to improve common mode noise rejection, and simultaneously reduce or eliminate the thermal noise from biasing at one half of the supply voltage using a resistor divider. Such embodiments make use of both a positive and negative supply rail for the amplifier(s) in this path. For example, the amplifier 212 may be supplied by both a positive low noise regulator 210 and a negative low noise regulator 218. In example embodiments, the use of both positive and negative power supply rails, in conjunction with the low-impedance feedback resistors of the amplifier chain bypasses those noise sources, resulting in a lower noise floor.

Some embodiments further include a high-pass or band-pass filter so that only ultrasound signals are amplified, and the audio band is rejected. For example, a filter may substantially reject signals with frequencies below around 18 kHz. A filter may also substantially reject high-frequency signals that could lead to aliasing. For example, if the amplified signal is to be sampled at 192 KHz by an analog-to-digital converter, it may be desirable to filter out frequencies that are higher than half of the sampling frequency, or 96 KHz.

In some embodiments, the microphone 204 is an ultrasonic microphone. In some embodiments, the output impedance of the ultrasonic microphone is specified at 3 Kohms. The input impedance of the emitter follower 206 may be configured to be at least that under an expected range of voltage and temperature conditions and to allow for manufacturing variations. It may be desirable to use a minimum input impedance value that is consistent with the microphone specifications because a higher input impedance of the emitter follower would inject more thermal noise from larger value biasing resistors.

In an example embodiment, the transistor 202 in the emitter follower stage 206 may be a bipolar junction transistor (BJT). For example, an MMBT3904 may be used. However, the choice of the transistor here is not critical as a single transistor does not introduce significant noise into the path. The MMBT3904 has a low cost and sufficient bandwidth and voltage range for this application.

Because an emitter follower has poor power supply rejection, example embodiments use a quiet supply that is well decoupled.

In an example embodiment, the output of the BJT 202 operates at an impedance level of about 100 to 160 ohms. The noise power of a resistor is proportional to its temperature and resistance. As a result of operating the filter stages at about $1/20^{th}$ of the microphone impedance (e.g., around 150 ohms instead of 3 k), each stage of the amplifier introduces around $1/20^{th}$ of the resistor noise power that would be introduced by a system operating at the microphone's output impedance.

In some embodiments, if the microphone noise is particularly low, it is possible to use an even lower output impedance. However, there is little benefit in reducing the noise level of subsequent stages below the noise floor of the microphone itself. At that point, attempting to further reduce the noise levels of subsequent stages by lowering the output impedance may increase power consumption without substantially improving the noise level of the system as a whole.

In some embodiments, an output 220 of the amplifier stage is provided to an ADC. It is desirable in such embodiments for a sufficient level of gain to be introduced to raise the signal above the noise floor of the ADO. In some embodiments, the ADC includes a built-in variable gain amplifier. In some embodiments, the variable gain is set to be 20 dB for ultrasonic signal detection applications, while the amplifier stage shown in FIG. 2 may itself have a gain of approximately 19 dB of gain in some configurations. With this much signal gain, normal audio signals could overwhelm any signals in the ultrasonic band, such as mouse vocalizations. In some embodiments, the amplifier stage uses an $8^{th}$ order Chebyshev bandpass filter to attenuate regular audio-band signals (e.g. voices, appliances, entertainment devices) below about 18 kHz and to provide anti-aliasing filtering above 96 kHz. Other types of high-pass or band-pass filtering may alternatively be used.

Figure 4:
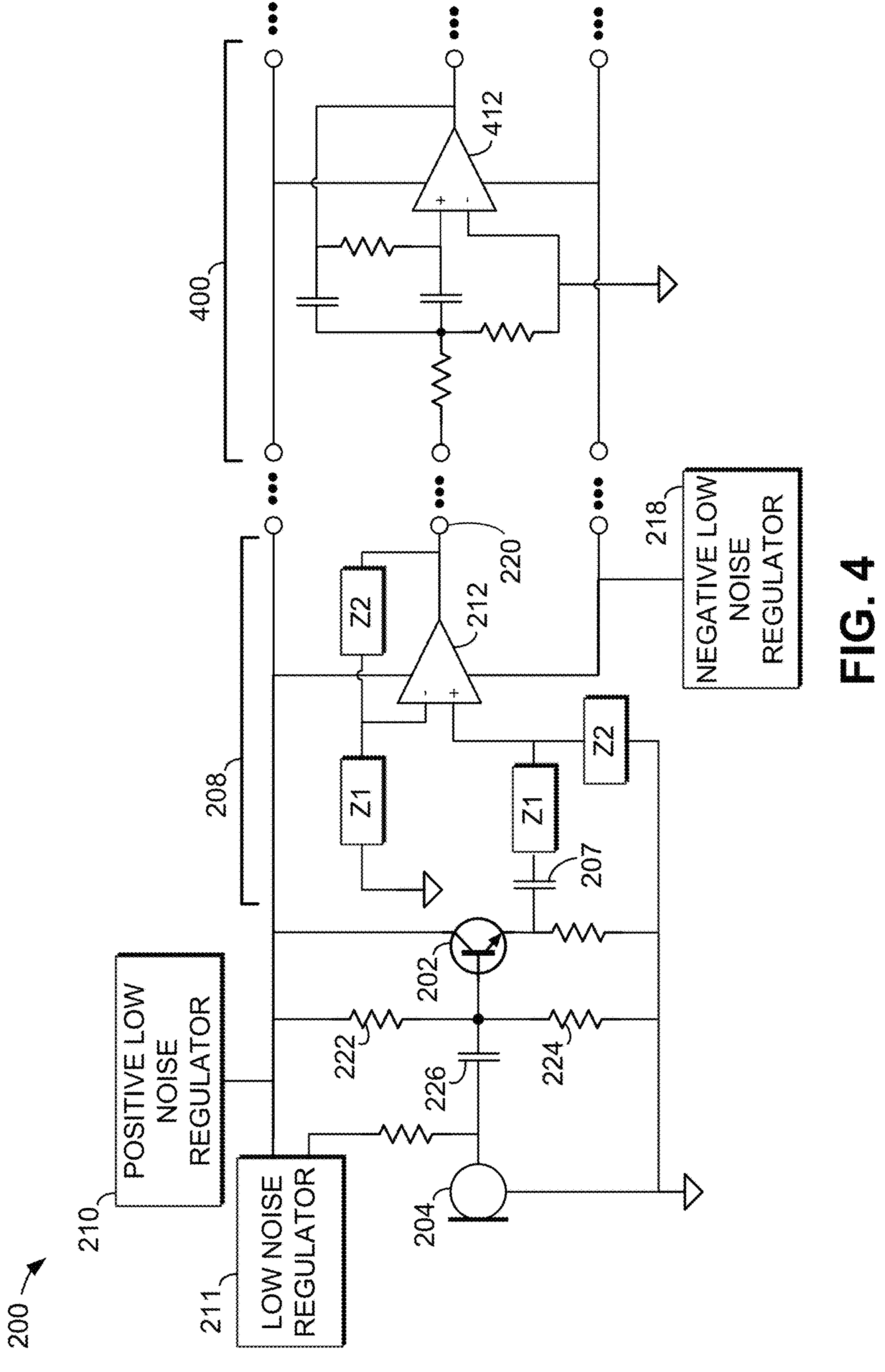
FIG. 4 is a schematic diagram of an analog front-end circuit according to some embodiments, using at least one amplifier stage and at least one active bandpass filter stage.

FIG. 4 is a schematic illustration of the circuit 200 as described above, in combination with an active filter stage 400. Zero or more additional amplifier stages similar to amplifier stage 208 may be arranged between amplifier stage 208 and the active filter stage 400. For example, some embodiments may use two amplifier stages 208 with Z1 and Z2, which provide both amplification and low pass filtering. In some embodiments, two active filter stages 400 (using resistors and capacitors) are combined to implement a 4th order Chebyshev bandpass filter. A greater number of filter stages may be used to provide sharper cutoffs for undesired filter frequencies. Such an arrangement may be selected to provide anti-aliasing at the high-frequency end and additional audio-frequency rejection at the low-frequency end.

Different embodiments may use different filter types, with appropriate filter types being selected as suitable for a given application. In some embodiments, one of the inputs of an op amp 412 in the active filter stage 400 is referenced to ground (e.g. connected directly to ground). This is made possible through the use of a bipolar supply, including both a positive voltage regulator and a negative voltage regulator, to supply the active amplifier stage(s) 400. If only a single positive supply were used, that input would have to be biased at, for example, half of that positive voltage supply. This could be done with a high-impedance resistor divider, which minimizes power consumption, size, cost, and heat produced by those resistors, but it also injects noise directly into the amplifier chain. Such noise is reduced or eliminated with the use of bipolar power supplies In the filter stage(s) 400 of some embodiments, capacitor values may range from 3.9 to 82 nF. In general, the capacitances are inversely proportional to the impedance of the resistors for the same frequency response (in general, each RC pair is a constant, so if you increase R you need to decrease C proportionally to keep the same filter response).

Capacitors with Class 2 dielectrics (X5R, Z5U, Y5V, etc.) may be avoided in audio and ultrasonic applications due to their susceptibility to vibrations which can interfere with the intended signal. In example embodiments, Class 1 dielectrics (NPO, COG) may be used. Testing with vibration motors has shown that Class 1 dielectrics have higher stability and are acceptable for this application. These ceramic capacitors are a small fraction of the size of equivalent value film capacitors, making the circuit much smaller.

In an example embodiment, very low noise op-amps may be used for the gain section, for example as op amp 212. In some embodiments, the Analog Devices ADA4896-2A may be used, which has a noise floor of 1 nV/√Hz in the ultrasonic region. Without a comparably low noise floor, the amplifiers themselves may overwhelm the noise contributions of the resistors.

Example embodiments achieve a very low noise amplifier system that can reveal the noise floor of the microphone itself, whereas more conventional designs are limited by noise in the high-impedance amplifier chain, which can be many dB higher.

The high-pass filter reduces the risk of audio-band amplification saturating and interfering with ultrasonic band signals.

Example embodiments are not limited to the specific applications described herein and may be implemented in other systems where a high-impedance and/or wide-band signal source is used, and a very low noise and/or narrow band signal is the desired output.

It should be understood that embodiments of the present disclosure may consume more power, space, and cost than conventional designs. However, considerations of power consumption and/or space may be resolved using implementations in which the embodiments are implemented in a sensor node configured to be plugged directly into an electrical outlet, such as the sensor node of FIGS. 1A-1F.

Allowing for filtering out of the acoustic band signal provides for more flexibility in setting overload point since acoustic energy tends to be far louder than ultrasonic band energy in some environments, for example where the system is implemented in a sensor node configured to be plugged in to a household AC electrical outlet.

Figure 3:
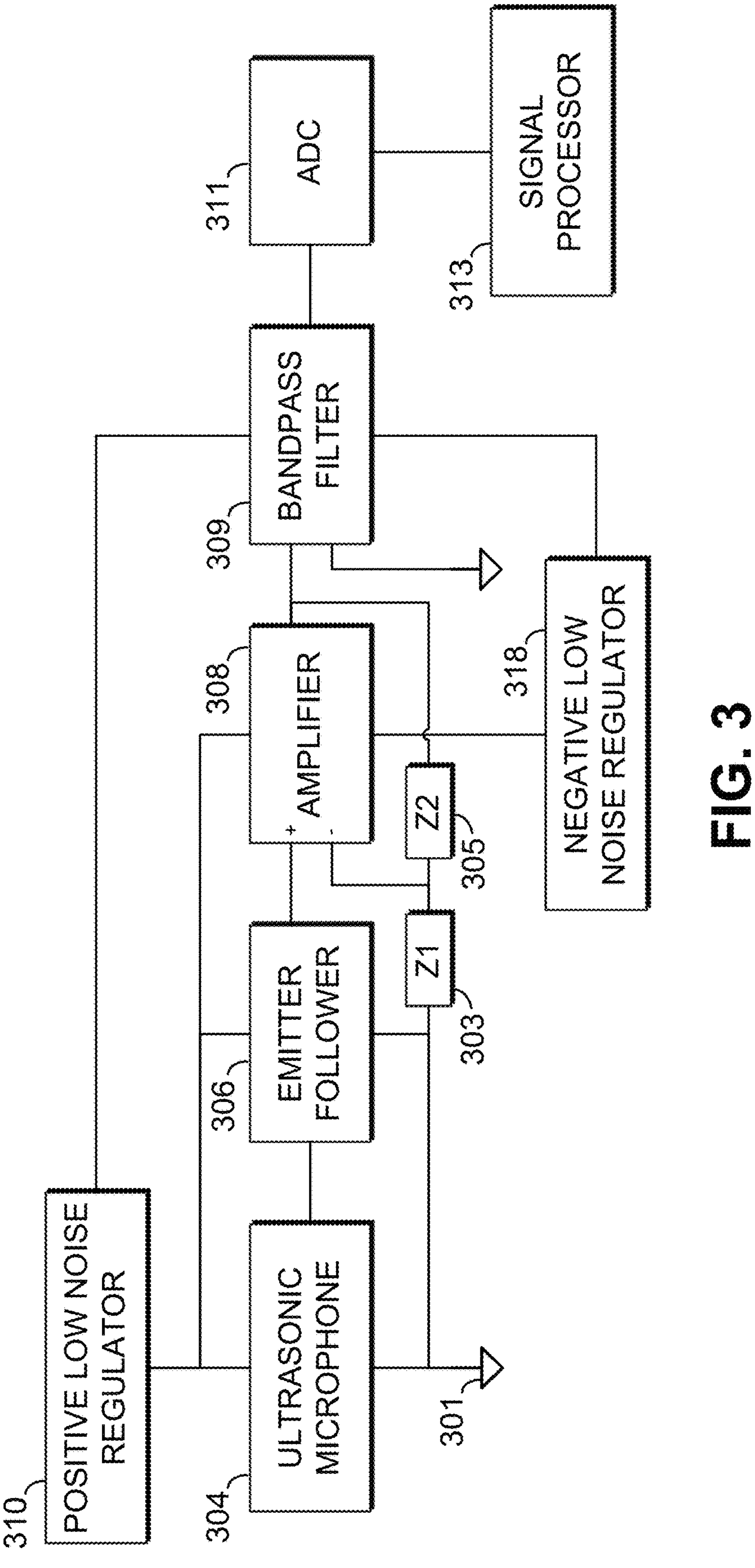
FIG. 3 is a functional block diagram of circuitry using analog front-end circuit according to some embodiments.

FIG. 3 provides a functional block diagram of another example embodiment. A microphone stage 304, which may be an ultrasonic microphone, is biased by a positive voltage source, such as a positive low noise voltage regulator 310, and referenced to ground 301. A signal from the microphone stage 304 is provided to an emitter follower or common collector stage 306. The emitter follower stage 306 is biased by the positive low noise regulator 310 and referenced to ground. The emitter follower stage 306 provides impedance matching between the microphone stage and an amplifier stage 308. A reference input of the amplifier stage is connected to the ground 301 through an impedance 303. This allows for rejection of common-mode noise in the signal received from the emitter follower stage 306. The reference input of the amplifier stage is also connected to an amplifier output through an impedance 305. The amplifier stage 308 is powered through a voltage differential between the positive low noise regulator 310 and a negative voltage source, such as a low noise regulator 318. The use of the negative low noise regulator 318 eliminates the need to use high-impedance resistors (which would otherwise generate an undesirable amount of noise) to bias the amplifier stage 308.

An output of the amplifier stage 308 is provided to a filter stage, such as a high pass filter or a bandpass filter 309, to filter frequencies provided to an ADC 311. The bandpass filter 309 may itself have a bipolar power supply from both the positive voltage regulator 310 and the negative voltage regulator 318. In one example, the bandpass filter 309 may have a passband of around 18 kHz to 96 kHz, though other ranges may alternatively be used. The low end of the passband may be selected to substantially remove frequencies that are audible to humans. The high end of the passband may be selected based on the sampling rate of the ADO 311 to prevent aliasing.

It may be noted that, in some embodiments, there is no sharp distinction between amplifier stages and active filtering stages, with each stage providing some level of gain and some level of filtering.

In some embodiments, the digitized signal from the ADC 311 may be provided to a signal processor module 313. The signal processor module may include hardware, such as one or more processors, microprocessors, microcontrollers, microchips, application-specific integrated circuits (ASICs), field programmable gate arrays (FPGAs), or memory devices. The signal processor module 313 may also include instructions executable for carrying out the one or more functions for processing the signal. Those instructions may take the form of or include hardwired instructions, firmware instructions, software instructions, and/or the like, and may be stored in any suitable non-transitory computer-readable medium or media, such as commonly referred to as RAM, ROM, etc.

In some embodiments, the signal processor module operates to determine whether the signal includes activity of animals such as rodents or pest insects. Such a determination may be made, for example, using a neural network according to techniques described in K. R. Coffee, et al., "DeepSqueak: a deep learning-based system for detection and analysis of ultrasonic vocalizations," Neuropsychopharmacology (2019) 44:859-868, or in Y. Goussha et al., "HybridMouse: A Hybrid Convolutional-Recurrent Neural Network-Based Model for Identification of Mouse Ultrasonic Vocalizations," Frontiers in Behavioral Neuroscience January 2022, vol. 15. Other techniques to detect pest activity may alternatively be used, such as ultrasonic activity in a predefined frequency range exceeding a threshold, which may be a predefined threshold. In some embodiments, the signal processor module 313 issues an alert in response to the detection of pest activity. The alert may be transmitted over a wired or wireless communication interface, or it may be a visible or audible alert.

An apparatus according to some embodiments includes a microphone, an emitter follower stage having an input coupled to the microphone, and an amplifier stage coupled to an output of the emitter follower stage.

In some embodiments, an impedance of the microphone is between 1 kohms and 5 kohms, or between 2 kohms and 3 kohms.

In some embodiments, the output of the emitter follower stage has an impedance of under 200 ohms.

In some embodiments, the output of the emitter follower stage has an impedance of between 100 and 200 ohms. In some embodiments, the output of the emitter follower stage has an impedance less than 1/10th an impedance of the microphone, or an impedance less than 1/20th an impedance of the microphone.

In some embodiments, the amplifier stage has an input impedance of under 200 ohms, or an input impedance of between 100 and 200 ohms.

In some embodiments, the amplifier stage includes at least one filter, each filter having a resistance of no more than 200 ohms, or no more than 100 ohms.

In some embodiments, the amplifier stage includes at least one filter, each filter having a capacitor with a capacitance between 3 and 90 nF.

In some embodiments, the amplifier stage includes at least one filter, each filter having a capacitor using a Class 1 dielectric.

In some embodiments, the amplifier stage and/or one or more filter stages is operative to filter out audio-band signals. In some embodiments, the amplifier stage and/or one or more filter stages is operative to prevent aliasing by filtering out frequency components of a signal that are above a Nyquist frequency of an analog-to-digital converter used to sample the signal.

In some embodiments, the apparatus is disposed in a sensor node having power plug prongs for coupling with an electrical socket, such as a household AC outlet.

Some embodiments, further include an analog to digital converter coupled to an output of the amplifier stage.

Some embodiments further include a low-noise regulator that supplies the emitter follower stage and the amplifier stage.

Some embodiments further include a low-noise regulator that supplies the emitter follower stage and the microphone.

A method according to some embodiments includes operating a microphone to convert an audio signal into an electrical signal; providing the electrical signal to an input of an emitter follower stage; and providing an output of the emitter follower stage to an amplifier stage. The audio signal may be an ultrasonic signal.

Some embodiments further include digitizing an output of the amplifier stage using an analog to digital converter.

As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Other variations of the described embodiments are contemplated. The above-described embodiments are intended to be illustrative, rather than restrictive, of the present invention. The scope of the invention is thus not limited by the examples given above but rather is defined by the following claims.

The invention claimed is:

1. An apparatus comprising:

a microphone;

an emitter follower stage having an input coupled to the microphone;

a positive voltage regulator;

a negative voltage regulator; and an amplifier stage coupled to an output of the emitter follower stage, wherein the amplifier stage is configured to be powered by the positive voltage regulator and the negative voltage regulator.

2. The apparatus of claim 1, wherein the microphone and the emitter follower stage are both referenced to a ground connection.

3. The apparatus of claim 1, wherein the microphone and the emitter follower stage are both biased by the positive voltage regulator.

4. The apparatus of claim 1, wherein the microphone and the emitter follower stage are both referenced to a ground connection and are both biased by the positive voltage regulator.

5. The apparatus of claim 1, wherein the amplifier stage is operative to filter out audio-band signals.

6. The apparatus of claim 1, wherein the amplifier stage includes at least one filter, each filter having a resistor with a resistance of no more than 100 ohms.

7. The apparatus of claim 1, wherein the amplifier stage includes at least one filter, each filter having a capacitor with a capacitance between 3 and 90 nF.

8. The apparatus of claim 1, wherein the amplifier stage includes at least one filter, each filter having a capacitor using a Class 1 dielectric.

9. The apparatus of claim 1, wherein the apparatus is disposed in a sensor node having power plug prongs for coupling with an electrical socket, the positive voltage regulator and negative voltage regulator being powered through the power plug prongs.

10. The apparatus of claim 1, further comprising an analog to digital converter coupled to an output of the amplifier stage, wherein the amplifier stage is operative to filter out signals above half of a sampling frequency of the analog to digital converter.

11. The apparatus of claim 10, further comprising a signal processor coupled to receive digitized signals from the analog to digital converter, the signal processor being operative to detect ultrasonic sounds indicating activity of pest animals.

12. A method comprising:

operating a microphone to convert an audio signal into an electrical signal;

providing the electrical signal to an input of an emitter follower stage; and providing an output of the emitter follower stage to an amplifier stage, wherein the amplifier stage is powered by a positive voltage regulator and a negative voltage regulator.

13. The method of claim 12, wherein the microphone and the emitter follower stage are both referenced to a ground connection and are both biased by the positive voltage regulator.

14. The method of claim 12, further comprising operating the amplifier stage to filter out audio-band signals.

15. The method of claim 12, wherein the amplifier stage includes at least one filter, each filter having a resistor with a resistance of no more than 100 ohms.

16. The method of claim 12, wherein the amplifier stage includes at least one filter, each filter having a capacitor with a capacitance between 3 and 90 nF.

17. The method of claim 12, wherein the amplifier stage includes at least one filter, each filter having a capacitor using a Class 1 dielectric.

18. The method of claim 12, further comprising powering the positive voltage regulator and the negative voltage regulator through an AC electrical outlet.

19. The method of claim 12, further comprising digitizing an output of the amplifier stage to obtain a digitized signal representing the audio signal, wherein the amplifier stage is operative to filter out signals above half of a sampling frequency of the analog to digital converter.

20. The method of claim 19, further comprising processing the digitized signal to determine whether the audio signal includes ultrasonic sounds indicating activity of pest animals.

* * * * *